LIGHT PRODUCING AND MEMORY MEANS

Original Filed March 23, 1960 3 Sheets-Sheet 1

INVENTORS
HARTMUT P. KALLMANN
BERNARD KRAMER
ERIC WEISSMAN
BY
ATTORNEY

LIGHT PRODUCING AND MEMORY MEANS

Original Filed March 23, 1960

INVENTORS
HARTMUT P. KALLMANN
BERNARD KRAMER
BY ERIC WEISSMAN

ATTORNEY

LIGHT PRODUCING AND MEMORY MEANS

INVENTORS
HARTMUT P. KALLMANN
BERNARD KRAMER
BY ERIC WEISSMAN

ATTORNEY

United States Patent Office 3,331,063
Patented July 11, 1967

3,331,063
LIGHT PRODUCING AND MEMORY MEANS
Hartmut P. Kallmann, New York, N.Y., Bernard Kramer, Bergenfield, N.J., and Eric Weissman, New York, N.Y., assignors to New York University, New York, N.Y., an educational corporation of New York
Original application Mar. 23, 1960, Ser. No. 17,165, now Patent No. 3,235,850, dated Feb. 15, 1966. Divided and this application Feb. 7, 1966, Ser. No. 529,910
14 Claims. (Cl. 340—173)

This is a division of our copending application Ser. No. 17,165, now Patent No. 3,235,850, filed Mar. 23, 1960.

This invention relates to an improved electroluminescent device and to its application for memory purposes and also to a method for operating such devices to provide improved information storage apparatus.

An electroluminescent material embodied in a suitable transparent binder of relatively high dielectric constant to define a cell specimen will emit a light flash ("on-flash") when energized by a DC electric field applied to the specimen. This phenomenon may be observed by sandwiching the specimen between a pair of opposed electrodes, one of which is at least transparent and applying a pulse of DC voltage across the electrodes. The energized specimen will emit a second flash of light ("off-flash") when the electrodes are shorted. The intensity of the second flash will be comparable to the intensity of the first flash or in some cases the second flash is considerably greater. The intensities of the light flashes are a function of the magnitude of the energizing voltage and, in particular, the light flash intensity will increase almost exponentially with increasing magnitudes of energizing voltage. If the foregoing "on-off" operation is repeated, that is to say, the specimen is alternately energized (an "on" pulse) and shorted (an "off" pulse) then again energized and shorted with further repetition of the "on" and "off" pulses, the light flash of the successive pairs of "on-off" pulses are of the same order of magnitude as the light flashes of a previous pair of "on-off" pulses.

It is the principal object of the invention to provide an electroluminescent device and a method for operating same, which device is characterized by electroluminescent material mixed with or otherwise embedded in dielectric matrix material and energizing such device by distinctive and successive DC voltage pulses of opposite polarity, whereby said device produces light flashes many times brighter than the light flashes normally emitted by the foregoing described unidirectional DC "on-off" pulse operation even if the magnitude of the opposite polarity voltages are the same as the unidirectional DC voltage. The light flash emitted by an electroluminescent device in accordance with the invention is related exponentially to the instantaneous strength of the internal electric field in the matrix. The instantaneous electric field visualized by the electroluminescent matrix will depend upon the previous history retained or remembered by the specimen. The intensity of the emitted light flash is increased by increasing the instantaneous internal field strength in the specimen when applying successive pulses of reverse polarity across same. The residual component of internal electric field retained by the specimen after the first voltage is removed is in opposite direction to the internal electric field established therein when the voltage was applied. Consequently, when the second voltage of opposite polarity is applied to the specimen, the instantaneous component fields are in the same direction and thus additive to establish an internal field larger than the individual component fields. This instantaneous large aggregate field can produce light flashes of about 100 times brighter than the aforesaid unidirectional DC voltage "on-off" flashes without the need of employing increased pulse voltages even if the second voltage is applied a consideraeble period of time after the first voltage.

It is a further object of the invention to provide an improved memory apparatus and a method for operating same by polarizing an electroluminescent specimen as contemplated herein by successive and distinctive voltage signals, whereby light responses are obtained of the order of 100 times brighter than the light emitted by normal unidirectional DC voltage "on-off" operation. Such memory apparatus may be made up of a large number of small cell specimens, each large enough to emit detectable light signals and arranged in a matrix array, whereby voltage pulses may be selectively applied to any one or more of the cell specimen. Information is printed on any one or more of the specimens by applying a voltage pulse of given polarity, for example, plus polarity, to the selected specimen. All cell specimens which were subjected to the plus polarity, retain or store an internal electric field upon removal of the printed pulse, whereas all other cells do not have any printed information. The information printed on the cell is read off by applying a voltage pulse of minus polarity to any one or more of the cell specimens in question. If information was written into a cell specimen by a previous pulse, a large light signal is emitted when the specimen is subjected to the minus polarity pulse. The cell specimens free of any previous printed information respond to the minus pulse by emitting small light signals. The effectiveness of the memory device depends upon the capability of the electroluminescent specimen to retain a polarized component of electric field established by the original voltage pulse. Furthermore, information printed on any cell may be erased by illuminating same with an erasing light when no voltage pulse is applied to the cell, whereby its internal polarization is immediately destroyed.

It is a further object of the invention to provide light producing memory specimens and a method for operating same by polarizing same with opposite polarity voltage pulses within the safety limits of the dielectric structure of the electroluminescent specimen to assure operation without voltage breakdown.

It is a further object of the invention to provide an improved memory cell specimen constituted by electroluminescent material in combination with a dielectric material, which cell is characterized to emit light flashes of large intensity in response to a voltage applied across same; said cell is also characterized to retain its previous polarization history for an appreciable length of time whereby such memory specimen will emit high intensity light signals in response to opposite polarity DC voltages spaced apart considerably in time.

Further objects and advantages will become apparent from the following description of the invention taken in conjunction with the figures, in which:

FIG. 1 is a schematic depiction of a light producing memory cell and DC energizing source therefor in accordance with the principles of the invention;

FIGS. 2*a* and 2*d* depict schematically a theoretical explanation of the foregoing cell in response to various types of polarizing pulses;

Figure 6A:
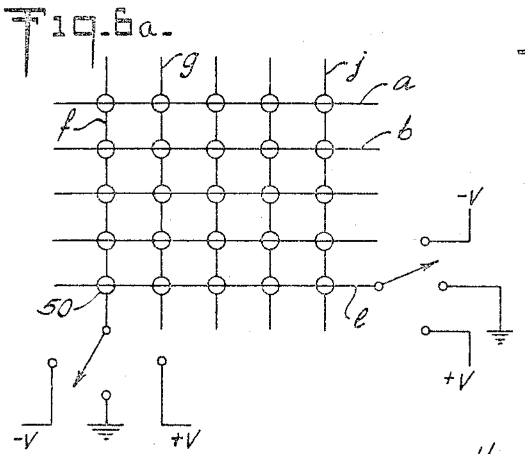
Figure 6B:
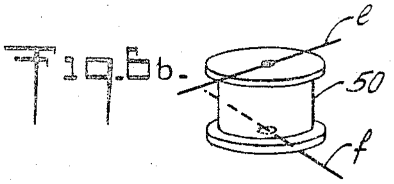
Figure 7B:
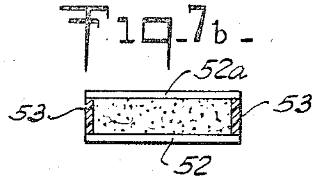
Figure 7A:
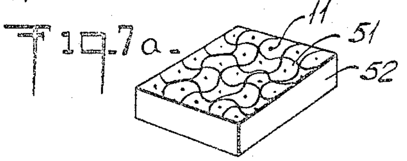
Figure 8A:
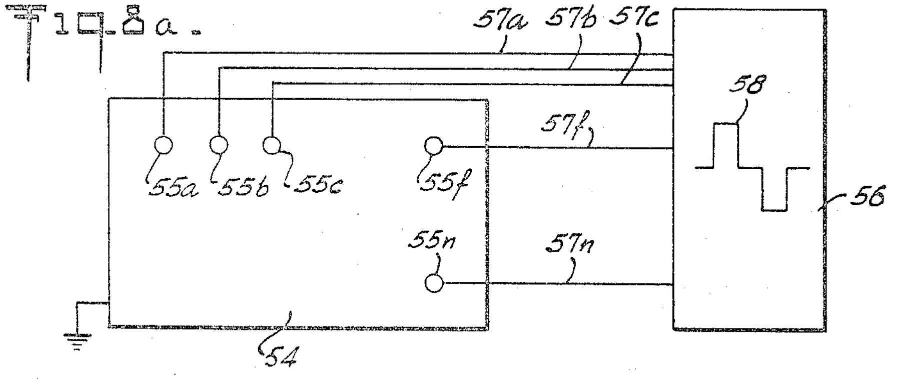
Figure 8B:
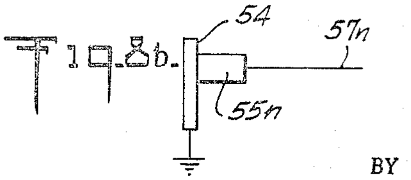

FIG. 6*a* illustrates a plurality of cells in accordance with the invention arranged as an *n* square array; and FIG. 6*b* shows schematically a single cell of such array;

FIG. 7*a* is a perspective view of a coated electrode illustrated to explain fabrication of a cell; and FIG. 7*b* is a section of the assembled cell; and FIG. 8*a* is a schematic illustration of a display device in accordance with the principles of the invention; and FIG. 8*b* is a fragmentary side view of the device shown in FIG. 8*a*.

Figure 1:
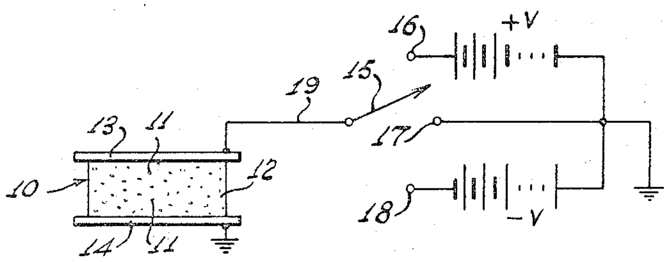

FIG. 1 discloses a light producing memory cell 10 in accordance with the practice of the invention. Cell 10 is made up of electroluminescent material, such as powdered phosphor, depicted as dots 11, in a transparent matrix 12, such as castor wax or tricresyl phosphate to constitute the electroluminescent specimen. Cell 10 is bounded on its sides by a pair of opposed conducting electrodes 13, 14. At least one of the electrodes 13, 14 is transparent or sufficiently transparent to permit detection of light emitted by cell 10 during its operation as an electroluminescent specimen. Electrode 13 is conductively connected by a lead 19 to a switch arm 15. Switch arm 15 is adapted to make contact individually with terminals 16, 17 or 18. Electrode 14 is grounded. A positive voltage V is connected across cell 10 when switch 15 is connected to terminal 16. A voltage of like magnitude but of opposite polarity, —V, is connected across cell 10 when switch arm 15 connects to terminal 18. The voltage is removed and cell 10 is shorted when switch arm 15 is connected to terminal 17. Other known electronic switching devices may be used to effect the foregoing operation for the purpose of supplying opposite polarity voltages of like magnitudes across cell 10 and for shorting said cell.

The following description of operation contemplates polarizing cell 10 with a unidirectional DC voltage. It will be assumed that cell 10 is initially unpolarized and switch 15 is open, that is to say, switch 15 is at an intermediate position as illustrated in FIG. 1. It will also be assumed that the cell matrix 12 is castor wax. For the purpose of definition, an "on" pulse means the application of a DC voltage across cell electrodes 13, 14, and an "off" pulse means shorting the electrodes. Cell 10 will emit a negligible light flash in response to the first "on" pulse at the instant arm 15 connects with terminal 16. Cell 10 emits a brighter light flash in response to the first "off" pulse at the instant arm 15 contacts ground terminal 17. For the purpose of comparing the brightness of the light flashes, it may be said that the first "off" flash has an intensity in the order of but greater than the value of unity magnitude. It will be understood that the brightness of successive light flashes resulting from the application of successive "on-off" unidirectional DC voltage pulses across a castor wax specimen ultimately levels off to equal to unity magnitude. Since the operation now being described is that in response to a unidirectional DC voltage pulse, the foregoing switching operation is repeated each time an "on-off" pulse is desired for causing cell 10 to emit light. This contemplates alternating arm 15 between contacts 16 and 17. The light intensity emitted by cell 10 at the moment the second polarizing "on" pulse is applied will be less than unity intensity but brighter than the light flash emitted in response to the first "on" pulse. The light flash in response to the second "off" pulse will be less bright than the light flash emitted in response to the first "off" pulse but still greater than unity magnitude. After three or four successive "on-off" pulses, the intensities of the light flashes emitted by the castor wax cell 10 will level off and remain equal to approximately unity magnitude for both the "on" and "off" pulses.

With respect to a cell specimen having a tricresyl phosphate matrix, the light flash intensities emitted thereby in response to successive unidirectional DC voltage pulses are as follows. For the first pair of "on-off" pulses, the correlated intensities of the light flashes will be, respectively, substantially negligible and in the order of unity magnitude. For successive applications of such "on-off" pulses, the individual "on" pulses will cause cell 10 to emit light flash intensities of the order of $1/10$ of unity magnitude, whereas the "off" pulse brightness will remain approximately unity magnitude.

In accordance with the principles of the instant invention, the brightness of light flashes may be regulated by the magnitude of the applied voltage pulse, because the intensity of the emitted light flash will vary almost exponentially as a function of the magnitude of the DC voltage applied across the cell specimen. Moreover, the intensity of the emitted light flashes may be substantially increased by reversing the polarity of successive polarizing "on" voltage pulses applied to the cell specimen, and this phenomenon may be realized even if the magnitudes of the opposite polarity voltages are equal. By suitably selecting the matrix material and applying successive and distinct opposite polarity DC voltage pulses across the cell, "on" light flash intensities may be achieved as much as one hundred times the brightness of the light flashes produced by unidirectional DC voltage pulses. Furthermore, these high intensity light flashes produced by successive and opposite polarity voltage pulses will be observed even if the latter polarizing pulse is applied to cell 10 as much as one-half hour after the prior pulse has been applied. Light flashes produced by opposite polarity pulses will reduce in magnitude and compare in intensity with unidirectional DC voltage light flashes only if the interval of time between the two opposite polarity voltage pulses is very long. This phenomenon is indicative that a cell specimen 10 in accordance with the invention will remember and for an appreciable time interval whether it was previously actuated by an input "on" pulse signal and if so actuated, the cell specimen will also indicate the polarity of the actuating signal with respect to the polarity of the sensing signal, the next successive "on" pulse.

The following description contemplates operation of a cell 10 having a castor wax matrix in accordance with the invention, wherein the specimen is polarized by successive and distinct DC voltage pulses of opposite polarity. The circuit shown in FIG. 1 is adapted to carry out this operation by alternating switch arm 15 to contact terminals 16, 17 and 18 and then 17 and 16, etc. This sequence of switch operation may be repeated as long as opposite polarity pulses are to be applied across cell specimen 10. For a castor wax specimen, assuming cell 10 is unpolarized at the start, the first pair of "on-off" pulses will produce correlated light intensities which are, respectively, negligible and in the order of but greater than unity magnitude. The next "on" pulse is provided by moving arm 15 from ground terminal 17 to terminal 18. The light flash intensity will be in the order of three times the brightness of unity magnitude. The light intensity emitted by the following shorting "off" pulse will be in the order of unity. With subsequent opposite polarity pulsing, the individual "on" pulses will cause light flashes having a brightness in the order of three times unity magnitude. On the other hand, the shorting "off" pulses will cause light flashes having a brightness remaining approximately unity magnitude. A cell specimen 10 having a tricresyl phosphate matrix will generate similar light intensity responses except that the second "on" pulse, —V, and the successive "on" pulses will generate a light brightness in the order of 100 times the brightness of unity magnitude. In addition to the fact that tricresyl phosphate produces greater light internsity responses for opposite polarity operation, this material also remembers a previous voltage polarizing signal for a longer time interval than a castor wax matrix.

A theoretical explanation of the memory and the light producing characteristics of a cell specimen 10 in accordance with the invention has not been confirmed conclusively. However, these characteristics are attributed to the following phenomenon. When a DC polarizing voltage pulse is applied to a cell specimen, a charge displacement current is produced which establishes a non-uniform electric field in the cell. This internal electric field is a function of the applied voltage. Moreover, the magnitude and pattern of the electric field at the moment of the application of the "on" and "off" pulses also depend upon the internal electric field stored or remembered by the cell at the time of the application of these pulses. The stored electric field is attributed to the previous polarization history retained by the cell specimen. The foregoing phenomenon causes the cell specimen to emit a momentary light flash at the instant of applying the "on" and "off" pulses and the brightness of the light flash is related almost exponentially to the strength of the aggregate electric field in the interior of the cell specimen at the moment of applying these "on" and "off" pulses. The foregoing phenomenon is depicted in FIGS. 2*a* through 2*d*.

Figure 2A:
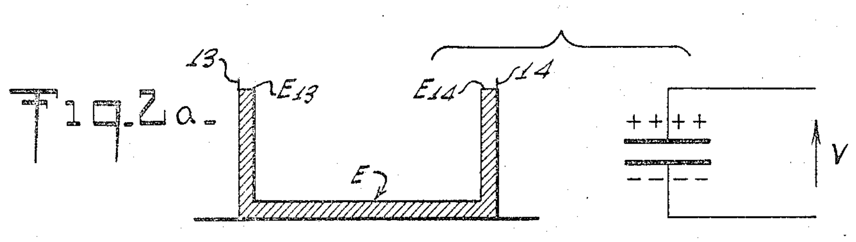

FIG. 2*a* illustrates the pattern of the electric field established in an unpolarized cell specimen 10 a short time after applying a first polarizing DC voltage pulse, plus V, across the specimen; the specimen is illustrated schematically in the same figure. The references 13, 14 in the curve of FIG. 2*a* depict the cell electrodes. The ordinate axis indicates the electric field strength in the cell 10. Upon the application of voltage V to cell 10, a relatively strong electric field is established contiguous the charged electrodes 13, 14 as shown by $E_{13}$ and $E_{14}$. The electric field in the interior of cell 10 is depicted by E. The strength of the internal field E is relatively small so that the integral of the electric field between the two electrodes is equal to the energizing voltage V.

Figure 2B:
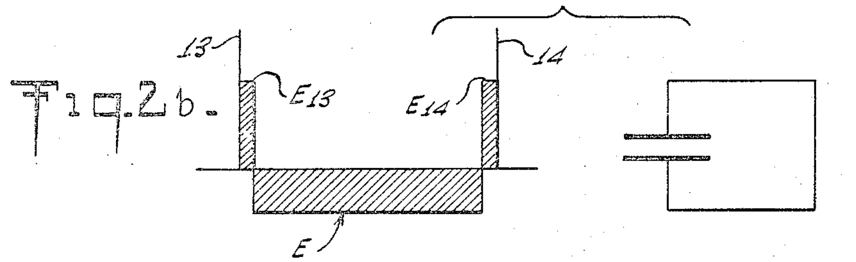

FIG. 2*b* illustrates the electric field pattern a short time after removal of voltage V and shorting cell specimen 10 as shown schematically in this figure. When cell 10 is shorted, the charges on the electrodes vanish and the electric field in the cell specimen reduces. However, the memory retention characteristics of the cell matrix cause the cell specimen to resist a collapse of the electric field near the electrodes for an appreciable interval of time. This is indicative that castor wax or tricresyl phosphate permits cell 10 to store electrical energy. Since the applied voltage across the electrodes is now zero, the field strength E in the interior of cell 10 becomes negative, whereby the integral of the total internal field is zero.

Figure 2C:
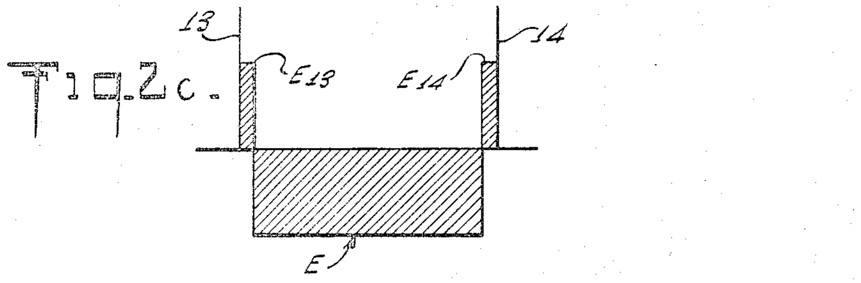
Figure 2D:
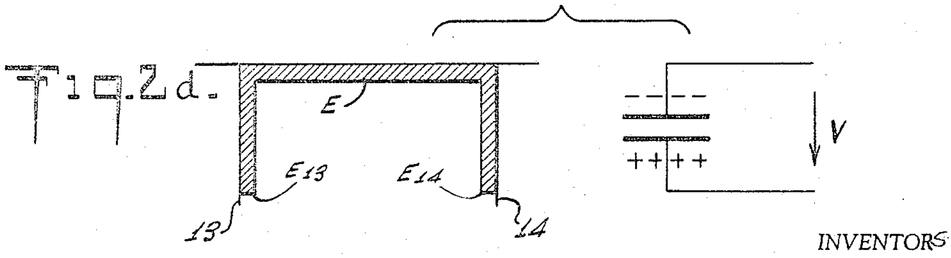

FIG. 2*d* depicts the electric field pattern a short time after applying an opposite polarity pulse, minus V, across cell specimen 10 as shown schematically in the figure. This pattern is the reverse of FIG. 2*a*. It will be assumed that the pulse is applied during the interval wherein cell specimen 10 still retains its polarized field as shown in FIG. 2*b*. FIG. 2*c* depicts the electric field in the cell at the instant of applying the reverse polarity voltage and represents the transition of the electric field pattern from that shown in FIG. 2*b* to the field shown in FIG. 2*d*. Inasmuch as the integral of the total internal field must equal minus V, field E in the interior of cell 10 becomes approximately twice the internal field component stored by the cell (depicted as E in FIG. 2*b*) at the instant the minus V voltage is applied. The instantaneous increase of field strength is related to the relatively bright and momentary light flash emitted by the cell at the instant of applying the minus V voltage. In other words, it may be said that the component of the internal field stored in cell 10 by reason of the memory peristence of its matrix is momentarily increased by the field component effected by the applied reverse voltage minus V. Both electric field components have the same polarity in the cell interior. The foregoing phenomenon is repeated upon following the same sequence of switching operation to apply the distinct and successive reverse polarity DC pulses. It will be understood that the description given with respect to FIGS. 2*a* through 2*d* should not be taken in any limiting sense.

Since the intensity of the emitted light is almost exponentially proportional to the change of the internal field strength components surrounding the electroluminescent material, bright intensity flashes may be achieved by the invention with relatively low voltage sources. For example, a 100 volt unidirectional DC "on-off" voltage pulse will produce light flashes of given intensity as described hereinbefore. On the other hand, much brighter light flashes occur when the cell specimen is polarized by successive and distinct pulses of opposite DC polarity even though the magnitude of the opposite polarity voltages is appreciably less than 100 volts. Accordingly, the application of reverse polarity pulses in accordance with the invention permits the use of relatively small operating voltages. This affords a number of advantages among which it permits the selection of safe operating voltages for polarizing a cell specimen to avoid dielectric breakdown where a higher voltage will cause such breakdown.

The memory persistence and light producing characteristics of a cell specimen also depend upon the duration of the time interval during which the cell remains shorted. It is preferable that this interval be short in time; however, it should not exceed 10 to 15 minutes otherwise the relative brightness of light resulting from opposite polarity operation may not be distinguishable from unidirectional DC voltage operation. Also, the duration of the interval during which an external voltage is maintained across a cell should be short to conserve power. However, this period should be long enough in time to effect proper polarization of the cell. Switching operation from an "on" to an "off" status is assumed to be relatively instantaneous.

A polarized cell may be neutralized; that is to say, a signal applied to cell specimen 10 may be erased at will by irradiating cell specimen 10 with any free charge producing radiation. Such radiation may be visible and ultraviolet light, X-rays or any other high energy radiaation. The erasure occurs because the high energy radiation neutralizes the internal field component retained by the cell by reason of some previously applied voltage signal. The erasing operation is applied during the grounding period.

Figure 3:
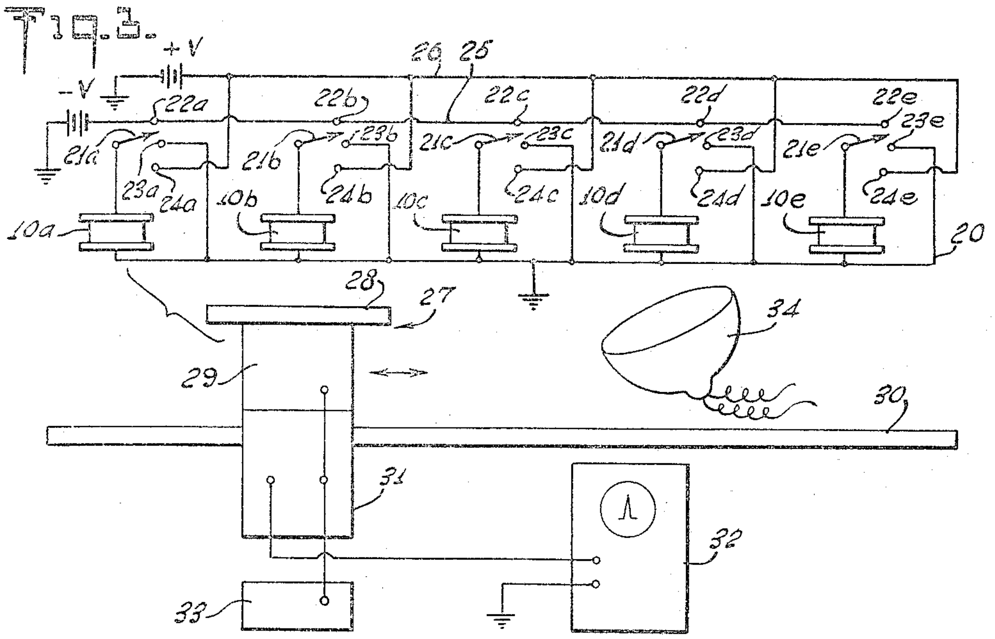
FIG. 3 depicts schematically an array of such cells to define information storage apparatus.

A plurality of electroluminescent cells may be employed in computer apparatus as depicted schematically in FIG. 3. FIG. 3 illustrates an array of cells 10*a* through 10*e*. The number of cells will depend upon the requirements of the particular operation. Five cells are shown herein for illustrative purposes. The individual lower electrodes of the cells are conductively connected by a common lead wire 20 to ground. The upper electrodes of the cells are each connected to a respective switch arm 21*a* to 21*e*. Each switch arm is adapted to alternate up and down to connect conductively with any one of three operatively associated terminal posts 22 to 24. The individual upper terminals 22*a* to 22*e* of each switch are connected by a common lead 25 to the negative side of a DC voltage source, minus V, the other side of which is connected to ground. The individual lower terminal posts 24*a* to 24*e* of the five switches are connected by a common lead 26 to the positive side of a DC source, plus V, the other side of which is connected to ground. The center terminal posts 23*a* to 23*e* of each of the switches are connected to common wire 20. When any one of the switch arms 21*a* to 21*e* connects to its operatively related center post 23, the respective cell is shorted. When an individual switch arm 21 is driven by suitable actuating means (not shown herein) to connect to its upper and lower terminal posts, the correlated cell is polarized by a voltage minus V and plus V, respectively. Each cell by reason of the foregoing arrangement may be polarized by successive and distinct opposite polarity DC voltages in the manner stated and described hereinbefore.

At the start of operation it will be assumed that all switch arms are connected to their respective center terminal posts in order to ground the individual cells. The switch arms are selectively and individually depressed to energize a correlated cell with a positive polarity pulse if operation calls for the application of an input signal to be applied to the cell, and hereinafter this action will sometimes be referred to as writing on the individual cell. The input signal impressed on a given cell then may be sensed or later read by applying a detecting pulse of opposite polarity to the cell, and this is brought about by alternating the correlated switch arm for the cell upwardly through ground and then to contact its upper terminal. When a sensing pulse is applied to a cell which was not previously actuated by an input signal, the intensity of the detecting light emitted by the cell will be relatively small in magnitude. On the other hand, when the sensing pulse is applied to a cell which was previously written upon, the detecting light will be comparatively large in intensity, because the sensing pulse will be of opposite polarity with respect to the writing signal. As noted hereinbefore, the five switches are contacting the grounded terminal posts at the start of operation. Certain of the switch blades will be selectively depressed to contact their correlated lower terminal posts in response to an input signal applied to the respective cell and then the switch arm is returned to its ground terminal. Subsequently, all the switch arms, individually or ganged, will be moved to contact their upper terminal posts to undergo the detection operation. The switch arms may be operated for movement by any well-known means such as current responsive relay coils, not shown herein. The individual light intensity signals emitted by each of the cells may be detected visually or by individual light meters or other detecting means.

An illustrative detecting device 27 is shown in FIG. 3. Detecting device 27 confronts one side of the five cells and includes shutter apparatus 28 mounted over photomultiplier means 29. Device 27 is supported to travel selectively from one position to another along track means 30 in synchronism with detection operation for the individual cells. For the purpose of this operation, it will be assumed that each cell is individually detected in a given sequence; for example, first cell 10*a*, then 10*b*, etc. In operation, detecting device 27 will occupy an operative position confronting the individual cells, one cell at a time. Movement of device 27 is regulated in synchronism with switch arm operation for each of the cells whereby shutter 28 confronts the particular cell about to be detected in preparation of receiving the light signal therefrom. Shutter 28 is normally closed but opens when the confronted cell is energized by its operatively associated detecting switch operation, whereby the light signal emitted therefrom impinges on photomultiplier 29 which feeds a corresponding electron current signal to an amplifier 31. The signal is suitably amplified and passed to an indicating means, such as an oscilloscope 32. After detection of an individual cell, its operatively associated switch arm is returned to ground position. This action actuates detecting device 27 to move to the next adjacent cell for similar detection operation. It will be understood that other types of indicators in lieu of oscilloscope 32 may be used, such as meters or mechanical recording devices. Reference 33 depicts power supply means for the illustrated apparatus. When detection is completed, all cells will have been polarized by a sensing pulse and if a new input or writing signal is applied to the individual cells, undesired flashes of light will occur. Furthermore, the intensity of light will depend upon the previous history remembered by the particular cell. For these reasons, the cell memories are erased by erase light means 34 before the new cycle of operation commences. This assures that each cycle of operation starts with fresh unpolarized cells. While erase light means 34 is being applied, shutter 28 is closed so that indicator 32 does not report any false signal. At the time erase light is applied, all the switch arms 21 are in grounded position to prevent a polarizing pulse to be applied to any of the cells during erasure.

Figure 4:
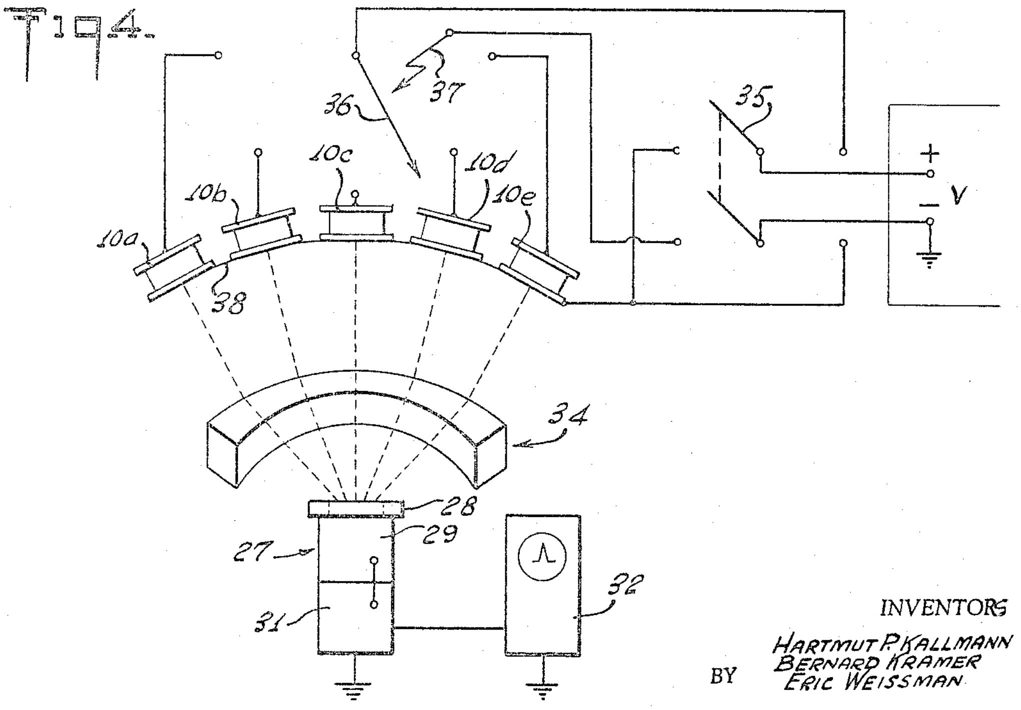
FIG. 4 depicts schematically another embodiment of information storage apparatus employing a cell specimen in accordance with the invention.

FIG. 4 depicts schematically memory storage and detecting apparatus which illustrates that it would also be within the scope of the invention to polarize the individual cell specimens with opposite polarity pulses without an intervening ground or "off" pulse. In addition, the figure also illustrates detection of the individual cells wherein detecting device 27 remains fixed in position by including an operatively associated lens system 34. The lower electrodes of the five cells, 10*a* through 10*e*, are conductively connected in series with the lower right terminal of a double pole, double throw reversing switch 35 for coupling a reversible DC voltage V across the cells. The upper right terminal switch 35 is connected to a detecting switch blade 36 adapted to make conductive contact individually with each of the upper electrodes of cells 10*a*–10*e* upon rotation of switch 36 from one to the next of its switch terminals. When switch 35 is in left position, it actuates a writing probe shown schematically as 37 with a DC potential. When the upper electrode of any one of the plurality of cells is individually touched by a writing probe 37, the particular cell is polarized with an input writing signal. With switch 35 thrown to the right position, the circuit is adapted for detection whereby each cell may be energized by a DC volage of opposite polarity with respect to the writing signal. Detecting device 27 is fixed in position opposite the front of center cell 10*c* and a cinemascope lens 34 is supported between device 37 and cells 10*a*–10*e*, whereby light emitted by the center cell passes directly into shutter 28 and light emitted by the cells to the right and left of cell 10*c* is bent and guided by lens 34 into shutter 28. To accommodate this arrangement, the cells to the right and left of cell 10*c* are positioned along a curved line 38. In other respects, detection is similar to the operation described hereinbefore. Shutter 28 is synchronized with movement of blade 36 to open whenever an individual cell is polarized for detection, whereby the signal generated by phototube 29 is amplified and detected by oscilloscope 32. It will be understood that oscilloscope 32 may be synchronized with the position of blade 36 so that an observer is always informed as to the cell being detected. Any other well-known lens system may be employed to effect proper focusing and bending of light to permit the use of a stationary light-sensitive detecting device.

Although not specifically stated hereinbefore, it will be understood that the voltage source employed for polarizing a memory cell specimen in accordance with the invention may be any conventional low current DC supply, such as batteries, or known square wave generator means, or other known electronic means.

Figure 5:
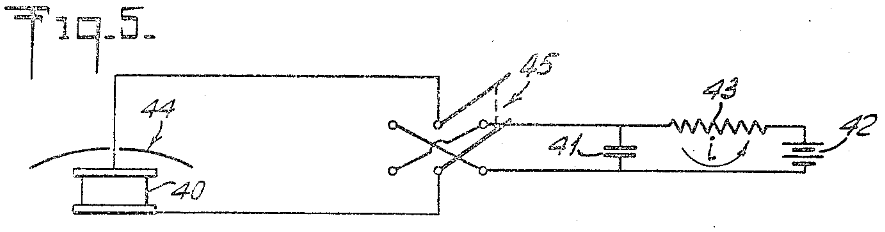
FIG. 5 illustrates another application of the improved cell in the form of a photo-flash device for camera means.

FIG. 5 illustrates the application of light producing cell specimen means 40 as a camera photo-flash device, and also illustrates a power supply circuit wherein the DC voltage is provided by discharging a capacitor 41, which capacitor is continually charged by a battery 42, through a resistor 43. Cell means 40 may incorporate a plurality of individual cells in parallel conductive relationship; however, only one cell is shown for illustrating the operation of the apparatus of FIG. 5. Memory cell 40 is supported in front of a suitable reflector 44 and is connected to the charged capacitor 41 by a reversing switch 45. Each time the camera shutter is triggered to open, reversing switch 45 is simultaneously actuated to shift from whatever switch position its blade is occupying to its other switch position thereby reversing the polarity of cell 40 in respect to the previous history remembered by the cell. During the light flash, a large surge current is supplied by capacitor 41. After the flash, capacitor 41 is recharged by battery 42. The capacitor charging current $i$ is depicted in FIG. 5 and is confined to the battery, resistor and capacitor loop. Current $i$ is very much smaller than the large surge current furnished by capacitor 41. Within a short time after the light flash terminates, capacitor 41 will be sufficiently recharged and ready for the next picture, wherein the foregoing operation is repeated; that is to say, the camera shutter is triggered, which simultaneously reverses switch 45.

FIGS. 6*a* and 6*b* illustrate another embodiment of a memory or storage device comprising a plurality of individual cell specimens. This embodiment involves an array of $N^2$ cells constituted by *n* horizontal rows and *n* vertical columns of cells. The cells may be of any convenient shape, such as small cylinders, see FIG. 6*b*, with electrodes at their upper and lower ends. The upper electrodes of *n* cells of each horizontal row are connected by a common lead wire of a plurality of *n* of such wires, *a*, *b*, . . . *e* to a respective switch, whereby all upper cell electrodes of such row may be alternately connected to a DC source, i.e., plus V volts, ground and minus V volts, respectively. The lower electrodes of *n* cells of each vertical column are connected by a common lead wire of a plurality of *n* of such wires *f*, *g*, . . . *j* to a respective switch whereby all lower cell electrodes of such column may be alternately connected to a DC source, i.e., plus V volts, ground, and minus V volts, respectively. For illustrative purposes, only row *e* and column *f* wires are shown with their respective switches. It will be understood that the other row and column wires also have similar switches. Moreover, the individual row wires are electrically isolated from each other, and similarly the individual column wires are also electrically isolated from each other. If the *e* row wire is connected to plus V volts and the *f* column wire is connected to minus V volts, cell 50 is polarized by a 2V "on" pulse. Assuming all other row and column wires are grounded, all other cells in the *e* row and *f* column are polarized by an "on" pulse of V volts, whereas all other cells in the array are grounded at both ends. To obtain an opposite polarity "on" pulse, the switches for *e* row and *f* column are alternated from an "on" pulse terminal through ground to their opposite polarity terminals. If the *e* row wire is now connected to minus V volts and the *f* column wire to plus V volts, then cell 50 is polarized by minus 2V volts. In light of the internal field retained by cell 50, when the minus 2V volts are applied, cell 50 experiences an instantaneous internal field equivalent to an applied voltage of 4V, i.e. an internal field component due to the minus 2V voltage plus the stored field. The other *e* row and *f* column cells are polarized by opposite polarity "on" pulses of V volts. Consequently, cell 50 emits the brightest light signal of any of the $N^2$ cells of the array. In this way any given cell of the $N^2$ array can be selected for an input writing signal and for reading such signal from the cell. It will be noted that although the array involves $N^2$ cells, it only requires 2*n* lead wires to connect the cells to the DC supplies. A memory device as illustrated in FIG. 6*a* may be used as apparatus for storing electrical energy, which energy later may be utilized by producing an electroluminescent signal. The storage of the electrical energy and the conversion of same as an emitted light flash of bright intensity may be readily produced by opposite polarity like magnitude DC voltages. It will be understood that for the $N^2$ cell array operation, all switching may be effected by known electronic means and light signals from these cells may be detected by the same phototube wherein the output of the phototube is synchronized with the application of the detecting voltage pulse for display on an oscilloscope.

Reference is now made to FIGS. 7*a* and 7*b*. A cell specimen as contemplated herein may be made in the following manner. A liquid mixture 51 of Duco cement and amyl acetate is coated on a suitably shaped flat plate 52 of relatively transparent conducting glass. In one working embodiment, Nesa glass of approximately 10 square cm., as depicted in FIG. 7*a*, was employed for this purpose. Powdered phosphor 11 is sprinkled on mixture 51 while it is in liquid form. Mixture 51 is permitted to dry; curing may be facilitated by heating same, whereby the amyl acetate evaporates to leave a rigid structure of electroluminescent grains of phosphor powder which adheres to plate 52. The rigid structure of phosphor grains is characterized by air space interstices throughout its body. Flakes of castor wax are then deposited on the structure and mleted so that the wax flows into and fills the air spaces. Before the castor wax is permitted to solidify, a second plate 52*a* similar in shape to plate 52 is placed over the phosphor-wax assemblage and adheres thereto as the castor wax solidifies. The open edges along the four sides of the assembly are sealed by a paste which is polymerized with an external quick curing agent to form a hard impervious sealing plastic 53 closing the four sides of the cell, as depicted in FIG. 7*b*. Any well-known low conductivity sealing paste may be employed so long as it does not interfere with the electrical characteristics of cell specimen operation. The amounts of powder and castor wax are not critical. However, it has been found desirable to use from about 200 to about 300 milligrams of powdered phosphor for a plate area of about 10 square cm. The quantity of castor wax employed is approximately equal in volume to the powdered phosphor inasmuch as about half of the dried phosphor structure in volume consists of air space interstices. The foregoing description is merely illustrative and may be varied to suit different applications of the invention. Tricresyl phosphate is a liquid which remains liquid in form. Hence, in forming a tricresyl phosphate cell specimen, the Duco cement-phosphor structure is sandwiched between a pair of plates 52, 52*a* and three sides of the assemblage are sealed off with the hardened plastic to permit pouring of the liquid tricresyl phosphate into the space between plates 52, 52*a* through the open side which is then sealed.

FIGS. 8*a* and 8*b* illustrate the application of the invention as a display device, for example, a device for displaying a received television signal. In this embodiment, a grounded transparent conducting plate 54 supports a plurality of *n* array of separate, distinct and closely spaced electroluminescent cells 55*a*, 55*b*, 55*c*, 55*d* . . . 55*n*. These cells are distributed in horizontal and vertical rows and columns, wherein plate 54 serves aa a common electrode for the inner end of each of the cells. In this embodiment, the cells may be of any convenient shape, for example, cylindrical as shown in FIG. 8*b*. The cells are very small in size, but large enough to emit light in response to opposite polarity unidirectional voltage pulses. The other or outer end of each cell is provided with electrode means, which end is conductively connected to suitable and known electronic switch-scanning means 56 by individual wires 57*a*, 57*b*, 57*c*, 57*d* . . . 57*n*. Switch means 56 is characterized to energize each cell individually for a very short period of time with a unidirectional voltage pulse opposite in polarity with respect to the previous pulse imparted to each cell. The DC pulse signals imparted by switch 56 is depicted at 58. During this time, the energized cell sends out a light flash. The cells are individually energized by means 56 in accordance with a scanning program which is synchronized with a scanning of the received television signal on a screen of a television cathode ray tube. Furthermore, the intensity of the pulse 58 imparted to each cell is also regulated by switch means 56 to correspond to the intensity of the received television signal as it is being scanned to energize the individual cells along the rows of the array, whereby each cell emits a corresponding light flash when it is energized which is synchronized with the received picture signal and the intensity of which is a function of such signal so that the picture displayed by the display apparatus shown in FIG. 8 corresponds to a picture which is normally displayed on a television cathode ray. As an alternative, it will be understood that switch means as shown hereinbefore may be used for the purpose of applying pulse voltages to cells 55*a* . . . *n*.

It is intended that all matter contained in the above description or shown in the accompanying drawings shall be interpreted as illustrative and not in a limiting sense.

What is claimed is:

1. A method for storing electrical energy in memory storage apparatus having a plurality of memory cells each made up of electroluminescent material in a dielectric matrix, which dielectric matrix is characterised to support an internal electric field upon the application of an external polarized DC voltage across said matrix and wherein said dielectric matrix retains a persistent residual component of such electric field upon removal of said voltage comprising the steps of selectively applying an external DC voltage of given polarity across the dielectric matrix of at least one cell of said plurality, removing the DC voltage applied to the polarized cell, applying a second external DC voltage across the dielectric matrix of the individual cells of said plurality wherein the polarity of the second voltage across a cell previously polarized is opposite the polarity of the first voltage applied to such cell, and measuring the brightness of the light flashes emitted by said plurality of cells at the instant of applying said second voltage, whereby a cell previously polarized by the first DC voltage emits relatively brighter light flashes than the other cells.

2. A method for storing electrical energy in memory storage apparatus having a plurality of memory cells each made up of a combination of electroluminescent material in a dielectric matrix of tricresyl phosphate wherein the combination is supported between conductive surfaces comprising the steps of selectively applying an external DC voltage of given polarity between the conductive surfaces of at least one cell of said plurality wherein a persistent internal electric field is established in the matrix of the polarized cell, removing the DC voltage applied to the polarized cell, applying a second external DC voltage across the individual cells wherein the polarity of the second voltage across a cell previously polarized is opposite the polarity of the first voltage applied to such cell, and measuring the brightness of the light flashes emitted by said cells at the instant of applying the second voltage thereto, whereby the cell which has stored electrical energy by reason of being previously polarized by said first voltage will emit a light flash instantaneously with the application of said second voltage of greater brightness than the light emitted by cell not previously polarized by said first voltage.

3. A method as defined in claim 2 comprising the additional steps of removing the second DC voltage from said cells, the removal of DC voltages contemplates shorting the conductive surfaces of the cells to ground, and wherein the process of selectively polarizing one or more of said cells and then polarizing all said cells with a second DC voltage is repetitive.

4. A memory device for storing electrical energy comprising spaced conductive elements wherein at least one of said conductive elements is light transparent, a matrix of dielectric material characterized to support an electric field upon the application of a DC voltage across said matrix and retaining a persistent residual component of such field upon removal of said voltage said component being of a polarity opposite to that of said voltage and capable of a magnitude approximating that of said voltage, electroluminescent material mixed with said matrix material to define an energy storage specimen, said specimen being supported between said conductive elements, means for applying a DC voltage of given polarity between said spaced conductive elements for polarizing said specimen wherein said specimen supports an internal electric field, said means also being adapted to remove said DC voltage, means for applying a second DC voltage between said spaced conductive elements of polarity opposite with respect to said given polarity, whereby said specimen emits a flash of light instantaneously with the application of said second voltage, and means for detecting the light emitted by said specimen, the brightness of said light flash being a function of the residual electric field component added to the electric field component effected by said second voltage.

5. Apparatus as defined in claim 4 wherein the removal of said DC voltage is constituted by shorting said conductive elements to ground.

6. Memory apparatus for storing electrical energy comprising a plurality of spaced pairs of conductive elements wherein at least one element of each pair is light transparent, a matrix of dielectric material characterized to support an electric field therein upon the application of a polarized DC voltage across said material and also characterized to retain a persistent residual component of said field upon removal of said voltage, said component being of a polarity opposite to that of said voltage and capable of a magnitude approximating that of said voltage, electroluminescent material mixed with said matrix to define an electroluminescent specimen, individual ones of said specimens being supported between respective pairs of said elements to define a plurality of memory devices, means for selectively applying a DC voltage of given polarity across at least one pair of elements for establishing an electric field in the specimen supported therebetween and also for removing said DC voltage, means for applying a second DC voltage of polarity opposite to said given polarity to the pair of elements which were previously polarized by said first voltage, said second means also being adapted to apply said second voltage to other memory devices of said plurality, and means for detecting light emitted by said devices upon the application of said second voltage thereto wherein the brightest light intensities will be emitted by those devices previously polarized by said first voltage.

7. Apparatus as defined in claim 6 wherein said matrix material comprises castor wax.

8. Apparatus as defined in claim 6 wherein said matrix material comprises tricresyl phosphate.

9. Apparatus as defined in claim 6 wherein the removal of said DC voltage contemplates shorting said conductive elements to ground, said detecting means comprising photo-multiplier means and an operatively associated shutter confronting the transparent ones of said conductive elements, said shutter being operated to open for the purpose of receiving light emitted by the individual ones of said memory devices, said photo-multiplier means supplying an output signal proportional to the intensity of the emitted light, and indicating means responsive to such output signal.

10. Apparatus as defined in claim 6 wherein said plurality of memory devices comprises $n$ horizontal rows of $n$ devices and $n$ vertical columns of $n$ devices constituting a quantity of $n^2$ devices, a quantity of two $n$ conductive wires, the individual conductive elements on one side of all devices of each row being connected to a common conductive wire of said quantity wherein a DC polarizing potential may be applied simultaneously to all such conductive elements of the row, the individual conductive elements on the other side of all devices of each column being connected to another common conductive wire of said quantity whereby a polarized potential may be applied simultaneously to all such conductive elements, wherein a memory device common to any one row and column may be polarized by the equivalent of successive and distinct opposite polarity external DC voltages of greater magnitude than the other memory devices of said such row and column.

11. Light producing electroluminescent means comprising a source of DC voltages; reversing switch means connected to said source for providing a DC voltage of opposite polarity in accordance with alternate operation of said switch means; and a light producing electroluminescent cell comprising, spaced conductive surfaces supporting a cell specimen therebetween, said conductive surfaces being connected to said switch means, and electroluminescent material supported in a dielectric material wherein the combination is held between said conductive surfaces to define said cell specimen, said dielectric material being characterized to support an internal electric field upon the application of a DC voltage between said conductive surfaces and also for retaining a persistent residual component of said field upon removal of said voltage, said component being of a polarity opposite to that of said voltage and capable of a magnitude approximating that of said voltage, whereby a light flash is produced instantaneously with the application of successive and distinct opposite polarity voltages to said conductive surfaces.

12. A light producing electroluminescent device comprising spaced conductive electrodes, a matrix of tricresyl phosphate supported between said electrodes, and electroluminescent material mixed with said tricresyl phosphate, whereby said cell emits a light flash of given brightness in response to the application of a DC voltage of given polarity between said electrodes and of greater brightness in response to the application of a successive and distinct DC voltage of opposite polarity between said electrodes.

13. A light producing device for displaying an information signal comprising an *n* array of specimen cells, each cell having electroluminescent material in a dielectric matrix, which matrix is characterized to support an internal electric field upon the application of an external polarized DC voltage across said matrix, and wherein said matrix contains a persistent residual component of such electric field upon the removal of said voltage, said component being of a polarity opposite to that of said voltage and capable of a magnitude approximating that of said voltage, and means selectively applying in programmed sequence opposite polarity DC voltage signals individually across each of said cells, the intensity of said voltage signals being regulated, whereby each energized cell emits a light flash in accordance with said programmed sequence and of relative brightness to produce an information signal.

14. A method for increasing the light output produced by a device made up of a combination of electroluminescent material supported in a matrix of castor wax or tricresyl phosphate which combination is supported between spaced conductive surfaces comprising the steps of applying an external DC voltage of given polarity between said surfaces wherein an internal electric field is established in said matrix, removing said DC voltage by shorting said surfaces to ground, and applying an external DC voltage between said surfaces of polarity opposite to said given polarity.

References Cited

UNITED STATES PATENTS 3,005,707 10/1961 Kallmann ------------- 96—1

BERNARD KONICK, *Primary Examiner.*

J. BREIMAYER, *Assistant Examiner.*